(12) United States Patent
Maeda et al.

(10) Patent No.: US 8,856,761 B2
(45) Date of Patent: Oct. 7, 2014

(54) INSTRUCTION PROCESSING METHOD, INSTRUCTION PROCESSING APPARATUS, AND INSTRUCTION PROCESSING PROGRAM

(75) Inventors: Munenori Maeda, Yokohama (JP);
Toshihiro Ozawa, Yokohama (JP);
Tsuyoshi Takeuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 132 days.

(21) Appl. No.: 13/421,419

(22) Filed: Mar. 15, 2012

(65) Prior Publication Data

US 2012/0239912 A1 Sep. 20, 2012

(30) Foreign Application Priority Data

Mar. 18, 2011 (JP) .................................. 2011-061324

(51) Int. Cl.
*G06F 9/45* (2006.01)
*G06F 12/02* (2006.01)
*G06F 9/455* (2006.01)

(52) U.S. Cl.
CPC .............. *G06F 9/4552* (2013.01); *G06F 12/02* (2013.01)
USPC ............................ 717/148; 717/153; 707/813

(58) Field of Classification Search
USPC ........................................................ 717/148
See application file for complete search history.

(56) References Cited

U.S. PATENT DOCUMENTS

| | | | |
|---|---|---|---|
| 6,189,141 B1* | 2/2001 | Benitez et al. ................. | 717/153 |
| 6,360,233 B1 | 3/2002 | Houldsworth | |
| 6,470,492 B2* | 10/2002 | Bala et al. ..................... | 717/128 |
| 2002/0032719 A1 | 3/2002 | Thomas et al. | |
| 2002/0040470 A1 | 4/2002 | Guthrie et al. | |
| 2003/0159134 A1* | 8/2003 | Souloglou et al. ............ | 717/148 |

FOREIGN PATENT DOCUMENTS

| | | |
|---|---|---|
| JP | 2002-519752 | 7/2002 |
| JP | 2003-526135 | 9/2003 |

OTHER PUBLICATIONS

M. Berndl and L. Hendren. Dynamic profiling and trace cache generation. Code Generation and Optimization, 2003. CGO 2003. International Symposium on, pp. 276-285, 2003.*
V. Bala, E. Duesterwald, and S. Banerjia. Dynamo: a transparent dynamic optimization system. Proceedings of the ACM SIGPLAN 2000 Conference on Programming Language Design and Implementation (PLDI), pp. 1-12, 2000.*
Gal et al., "Trace-based just-in-time type specialization for dynamic languages" Jun. 2009, SIGPLAN Not. 44, 6, pp. 465-478.*

* cited by examiner

*Primary Examiner* — James D Rutten
(74) *Attorney, Agent, or Firm* — Staas & Halsey LLP

(57) ABSTRACT

An instruction processing method includes generating a translated code block for an instruction, among instructions included in a target program to be executed and for which a number of executions through sequential interpretation is greater than or equal to a threshold, and storing the generated translated code block in a first storage unit and removing part or all of the translated code block from the first storage unit at a given timing, wherein the generating reduces the threshold with respect to the number of executions over a given period of time after the part or all of the translated code block is removed.

9 Claims, 19 Drawing Sheets

FIG. 4

| ADDRESS | NUMBER OF EXECUTIONS | TRANSLATED/ UNTRANSLATED FLAG | TRANSLATED CODE ADDRESS | ... |
|---|---|---|---|---|
| | | | | |
| | | | | |
| | | | | |

FIG. 9

| ADDRESS | NUMBER OF EXECUTIONS | TRANSLATED/ UNTRANSLATED FLAG | TRANSLATED CODE ADDRESS | INVALIDATION FLAG | ... |
|---|---|---|---|---|---|
| ... | ... | ... | ... | ... | ... |
| ... | ... | ... | ... | ... | ... |
| ... | ... | ... | ... | ... | ... |

| PAGE ADDRESS | FORCED REMOVAL FLAG |
|---|---|
|  |  |
|  |  |
|  |  |

INSTRUCTION PROCESSING METHOD, INSTRUCTION PROCESSING APPARATUS, AND INSTRUCTION PROCESSING PROGRAM

CROSS-REFERENCE TO RELATED APPLICATION

This application is based upon and claims the benefit of priority of the prior Japanese Patent Application No. 2011-61324, filed on Mar. 18, 2011, the entire contents of which are incorporated herein by reference.

FIELD

The embodiments discussed herein are related to an instruction processing method, an instruction processing apparatus, and an instruction processing program.

BACKGROUND

An interpreter and a just-in-time compiler (hereinafter referred to as the "JIT compiler") may be used to emulate the operation of a given central processing unit (CPU) when using a CPU having a different architecture. While sequentially interpreting instructions issued by a program, the interpreter monitors how often each instruction is executed. The interpreter inputs a request to translate an instruction having a high frequency of execution into machine code to the JIT compiler. The JIT compiler translates (compiles) the instruction associated with the request into machine code, and records the code obtained through the translation (hereinafter referred to as "translated code") in a memory area called a code cache. Thereafter, the translated code recorded in the code cache is executed when the instruction is to be executed. Consequently, the speed at which the program is executed is increased.

In general, interpreters measure the number of executions for each instruction, and make a translation request if the number of executions exceeds a given threshold. Interpreters may also increase the threshold if JIT compilers receive a large number of translation requests. For example, if a translation request from an interpreter is managed with a queue, a threshold may be changed in accordance with the length of the queue.

If a given amount or more of translated code is recorded in a code cache, some or all of the existing translated code is removed from the code cache in order to allow new translated code to be recorded. A process for removing translated code from a code cache (that is, for ensuring sufficient available space in the code cache) is generally called garbage collection (GC).

At the time of execution of an instruction after the execution of GC, the probability that no translated code for the instruction to be executed exists increases. Therefore, an instruction which has been executed at a high speed using translated code before the execution of GC may be subjected to sequential interpretation, and performance may be reduced.

The recovery of the performance of an instruction, which has been removed from a code cache by GC, to the extent that existed before the execution of GC involves waiting for the time taken for the number of executions of the instruction to again be greater than or equal to the threshold.

The following are examples of related art: Japanese National Publication of International Patent Application No. 2003-526135, and Japanese National Publication of International Patent Application No. 2002-519752.

SUMMARY

According to an aspect of the invention, an instruction processing method includes generating a translated code block for an instruction, among instructions included in a target program to be executed and for which a number of executions through sequential interpretation is greater than or equal to a threshold, and storing the generated translated code block in a first storage unit and removing part or all of the translated code block from the first storage unit at a given timing, wherein the generating reduces the threshold with respect to the number of executions over a given period of time after the part or all of the translated code block is removed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example configuration of a management table according to the first embodiment;

FIG. 9 is a diagram illustrating an example configuration of a management table according to a third embodiment;

FIG. 11 is a diagram illustrating an example configuration of a forced removal flag storage unit;

DESCRIPTION OF EMBODIMENTS

Figure 1:
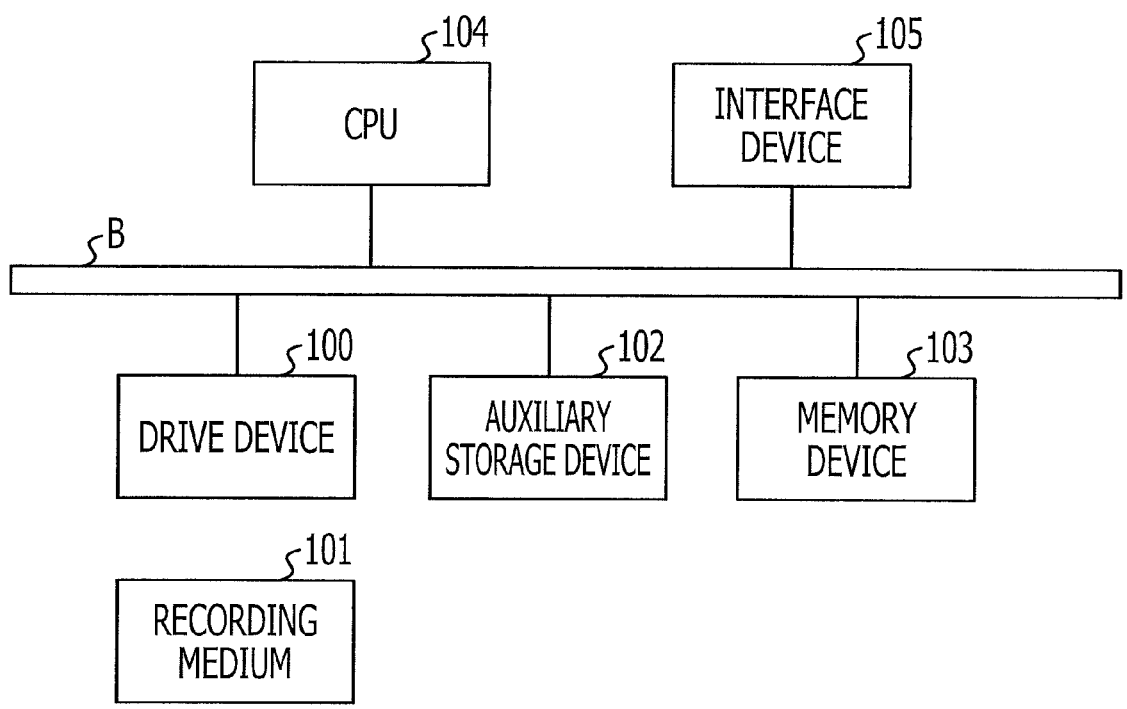
FIG. 1 is a diagram illustrating an example hardware configuration of an information processing apparatus according to an embodiment of the present disclosure.

Embodiments will be described hereinafter with reference to the drawings. FIG. 1 is a diagram illustrating an example hardware configuration of an information processing apparatus 10 according to an embodiment. The information processing apparatus 10 illustrated in FIG. 1 includes a drive device 100, an auxiliary storage device 102, a memory device 103, a CPU 104, an interface device 105, and any other suitable device, which are connected to one another via a bus B.

A program for implementing a process to be performed in the information processing apparatus 10 is provided by a recording medium 101. When the recording medium 101 on which a program is recorded is set in the drive device 100, the program may be installed into the auxiliary storage device 102 from the recording medium 101 through the drive device 100. Instead of installing the program from the recording medium 101, the program may be downloaded from another computer via a network. The auxiliary storage device 102 stores an installed program, and also stores files, data, and other desired information.

If there is an instruction for starting a program, the memory device 103 reads the program from the auxiliary storage device 102, and stores the read program. The CPU 104 executes functions of the information processing apparatus 10 in accordance with the program stored in the memory device 103. The interface device 105 is used as an interface for connecting to a network.

Examples of the recording medium 101 may include portable recording media such as a compact disc read-only memory (CD-ROM), a digital versatile disc (DVD), and a universal serial bus (USB) memory. Examples of the auxiliary storage device 102 may include a hard disk drive (HDD) and a flash memory. The recording medium 101 and the auxiliary storage device 102 correspond to computer-readable recording media.

Figure 2:
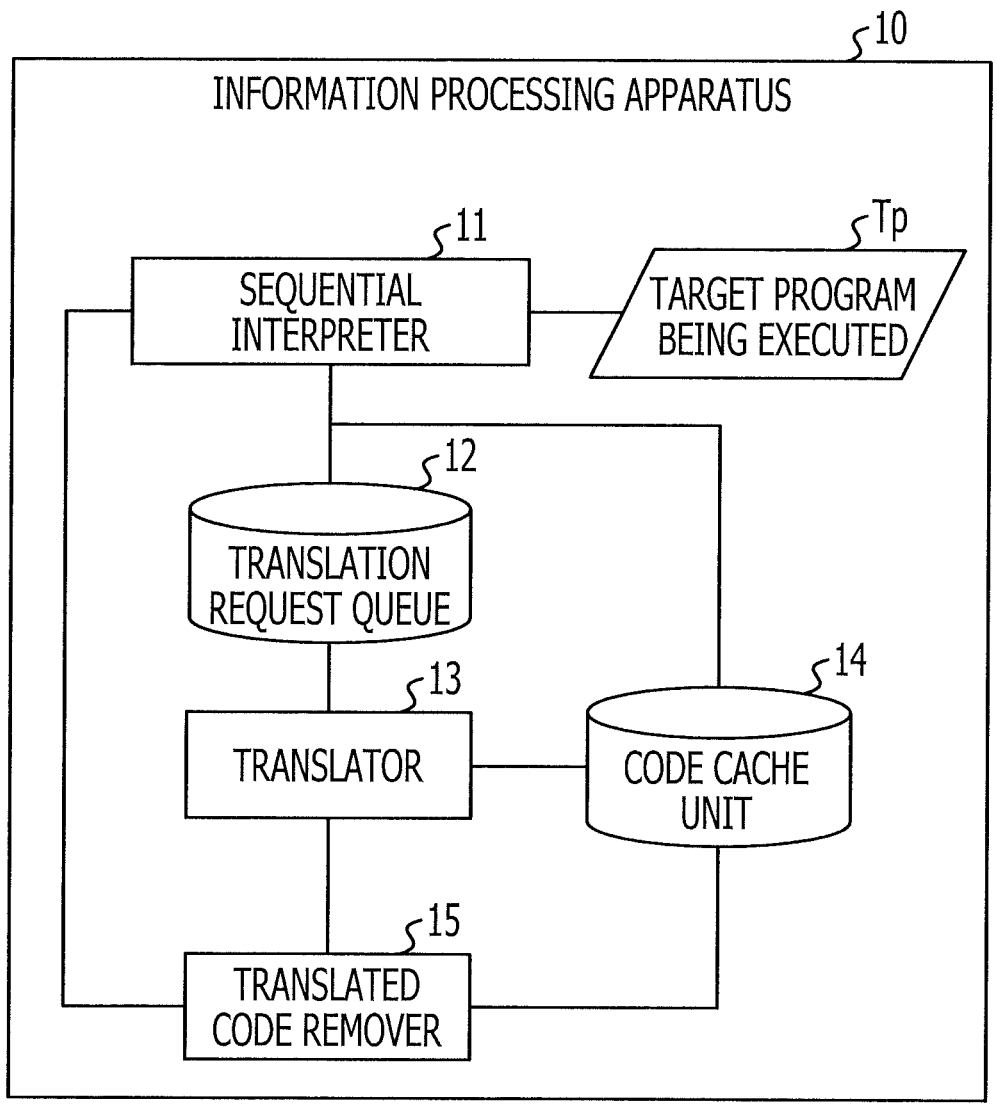
FIG. 2 is a diagram illustrating an example functional configuration of an information processing apparatus according to a first embodiment.

FIG. 2 is a diagram illustrating an example functional configuration of an information processing apparatus 10 according to a first embodiment. In FIG. 2, the information processing apparatus 10 includes a sequential interpreter 11, a translation request queue 12, a translator 13, a code cache unit 14, a translated code remover 15, and any other suitable element. The sequential interpreter 11, the translator 13, and the translated code remover 15 are implemented by a process that a program installed in the information processing apparatus 10 causes the CPU 104 to execute. The translation request queue 12 and the code cache unit 14 may be implemented using, for example, the memory device 103.

The sequential interpreter 11 sequentially interprets each instruction of source code or intermediate representation (intermediate code) of a target program being executed Tp, and executes the interpreted instruction. The target program being executed Tp is a set of data representing a program which is used as a target program being executed in this embodiment and which has been loaded into the memory device 103. The sequential interpreter 11 measures, for each instruction included in the target program being executed Tp, the number of executions of the instruction through sequential interpretation (that is, the number of times sequential interpretation has been executed). If an instruction for which the number of executions is greater than or equal to a threshold has occurred, the sequential interpreter 11 specifies the address of the instruction (that is, information about the position of the instruction in the target program being executed Tp), and enters a translation request in the translation request queue 12. The translation request queue 12 holds translation requests in a form such as a first-in first-out (FIFO) list.

More specifically, the number of executions is measured for a branch destination of each branch instruction included in the target program being executed Tp. Since the numbers of executions of a group of instructions included in a branch instruction match the number of executions measured for the branch destination of each branch instruction, there is no need to measure the number of executions for each instruction. Therefore, a branch destination address is specified in a translation request.

The translator 13 retrieves a translation request from the translation request queue 12, and translates a group of instructions associated with the addresses specified in the retrieved translation request into machine native code. For example, a group of instructions (or an instruction) that exists from an instruction associated with the address specified in the translation request up to the next branch instruction is translated. The code translated (or generated) by the translator 13 is hereinafter referred to as "translated code". The translator 13 stores the translated code in the code cache unit 14.

The code cache unit 14 stores translated code, a management table for storing management information about the translated code, and any other suitable information.

The translated code remover 15 executes garbage collection (GC) for the code cache unit 14. Specifically, the translated code remover 15 removes (deletes), for example, some or all of all the translated code stored in the code cache unit 14 and some or all of all the management information stored in the code cache unit 14 at a desired timing to ensure sufficient space is available in the code cache unit 14.

The sequential interpreter 11 may be implemented by using an "interpreter" program. The translator 13 may be implemented by using a "just-in-time compiler" program. Further, the translated code remover 15 may be implemented by using a "garbage collector" program. Each of the sequential interpreter 11, the translator 13, and the translated code remover 15 may be composed by a CPU, a digital signal processor (DSP), a processor, or the like.

Figure 3:
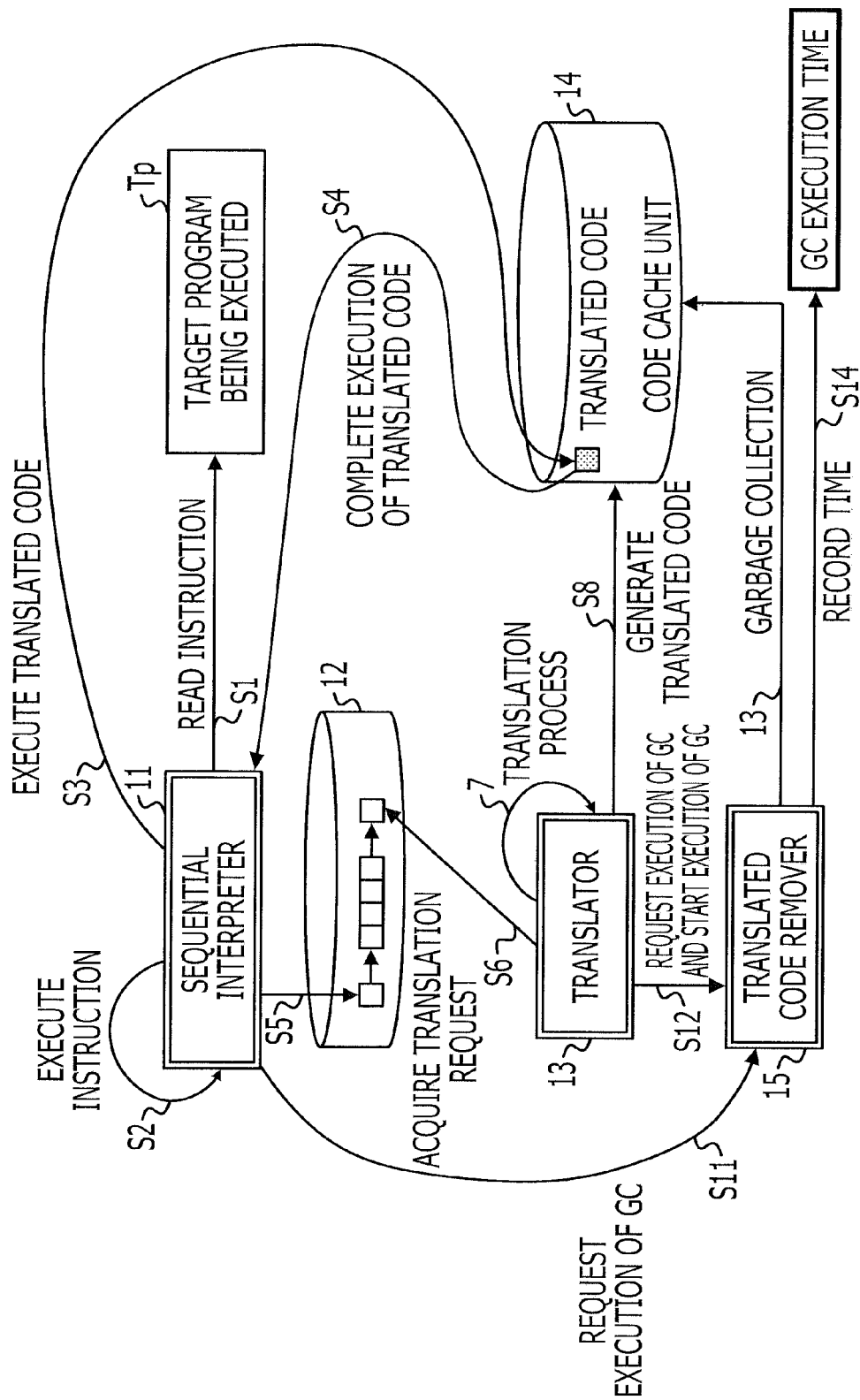
FIG. 3 is a diagram depicting an example of a processing procedure executed by the information processing apparatus according to the first embodiment.

A processing procedure executed by the information processing apparatus 10 will now be described. FIG. 3 is a diagram depicting an example of a processing procedure executed by the information processing apparatus 10 according to the first embodiment.

When a target program being executed Tp is loaded into the memory device 103 and the execution of the target program being executed Tp is started, the following processing procedure is repeatedly executed until the target program being executed Tp has been completed.

First, the sequential interpreter 11 reads an instruction in the target program being executed Tp (S1). If the read instruction is not a branch instruction, the sequential interpreter 11 sequentially interprets the instruction, and causes the CPU 104 to execute the interpreted instruction (S2). If the read instruction is a branch instruction and translated code for a branch destination address corresponding to the branch instruction has not been generated in the code cache unit 14, the sequential interpreter 11 sequentially interprets each instruction corresponding to the branch destination address, and causes the CPU 104 to execute the interpreted instruction (S2).

If the read instruction is a branch instruction and translated code for a branch destination address has been generated in the code cache unit 14, the sequential interpreter 11 causes the CPU 104 to execute the translated code (S3). When the execution of the translated code is completed, processing control is returned to the sequential interpreter 11 (S4).

Whether or not translated code for a branch destination address has been generated as well as the position (address) of translated code in the code cache unit 14 are determined by, for example, referring to the management table in the code cache unit 14.

FIG. 4 is a diagram illustrating an example configuration of a management table 14Ta according to the first embodiment. In FIG. 4, the management table 14Ta stores an address, a number of executions, a translated/untranslated flag, a translated code address, and any other suitable information.

The "address" referred to in the above example configuration of the management table 14Ta indicates a branch destination address of an instruction. Not including the address in the management table 14Ta may be desirable. The association between the address and each record of the management table 14Ta may be managed separately. The "number of executions" indicates the number of sequential executions of a group of instructions associated with the address. The "translated/untranslated flag" is information indicating whether or not translated code for the group of instructions associated with the address has been generated. For example, the value "true" indicates that translated code has been generated (translated), and the value "false" indicates that translated code has not been generated (untranslated). The "translated code address" indicates the position (address) at which translated code is stored in the code cache unit 14. The number of executions may be managed elsewhere than the code cache unit 14 (that is, managed in a form other than the management table 14Ta).

Accordingly, if the translated/untranslated flag in the management table 14Ta corresponding to a branch destination address is "true", the sequential interpreter 11 determines that translated code for the branch destination address has been generated. In this case, the sequential interpreter 11 specifies the stored position of the translated code based on the translated code address corresponding to the branch destination address.

However, whether or not translated code for a branch destination address has been generated may also be determined based on the translated code address instead of the translated/untranslated flag. Specifically, if a value has been recorded in a translated code address corresponding to the branch destination address, that translated code for the branch destination address has been generated may be determined. In this case, not including the translated/untranslated flag in the management table 14Ta may be desirable.

If the instruction read is a branch instruction, in S2, the sequential interpreter 11 adds 1 to the number of executions for the corresponding branch destination address in the management table 14Ta. However, if no record exists for the branch destination address, the sequential interpreter 11 adds a record corresponding to the branch destination address to the management table 14Ta, and records 1 in the number of executions corresponding to the record added.

Referring back to FIG. 3, if the number of executions is greater than or equal to a threshold as a result of the addition of 1, the sequential interpreter 11 enters a translation request in the translation request queue 12 (S5). In the translation request, a branch destination address is specified. In the translation request queue 12 illustrated in FIG. 3, each rectangular shape represents a translation request.

The translator 13 retrieves the translation requests, which were entered in the translation request queue 12, in ascending order by time (S6). The translator 13 executes a translation process on a group of instructions associated with an address specified in a retrieved translation request (S7). The translated code for the group of instructions is generated through the translation process. The translator 13 stores the generated translated code in the code cache unit 14 (S8). In the management table 14Ta, the translator 13 further updates the translated/untranslated flag corresponding to the address specified in the received translation quest to "true", and records the address at which the translated code is stored in a translated code address corresponding to the address specified in the received translation request.

If the amount of available space in the code cache unit 14 becomes less than or equal to a given value as a result of, for example, adding a new record to the management table 14Ta or storing new translated code in the code cache unit 14, a request to execute GC is sent to the translated code remover 15 (S11 or S12).

The translated code remover 15 executes GC in response to the request (S13). Specifically, the translated code remover 15 removes (deletes) some or all of all the translated code stored in the code cache unit 14 and some or all of all the records in the management table 14Ta from the code cache unit 14 (S13). Consequently, the memory space that the removed translated code and the removed records were occupying is released.

If the data to be removed is limited to part of all of the translated code, each record corresponding to the translated code to be removed is to be removed from the management table 14Ta. That is, each record that includes a translated code address which corresponds to an address of the translated code to be removed is removed.

Subsequently, the translated code remover 15 records the time when translated code and other information were removed (hereinafter referred to as the "GC execution time") in, for example, the memory device 103 (S14).

The GC execution time may be used to allow the sequential interpreter 11 to dynamically change the threshold for the number of executions. In S2 described above, the sequential interpreter 11 effectively reduces the threshold over a given period of time from the GC execution time. The reduction of the threshold allows translated code, which may have a smaller number of executions than usual, to be generated over the given period of time from the GC execution time. Therefore, translated code for a group of instructions having a high frequency of execution may be re-generated earlier than if the threshold was not reduced. Thus, the period of time over which the low performance caused by the execution of GC continues may be reduced.

Figure 5:
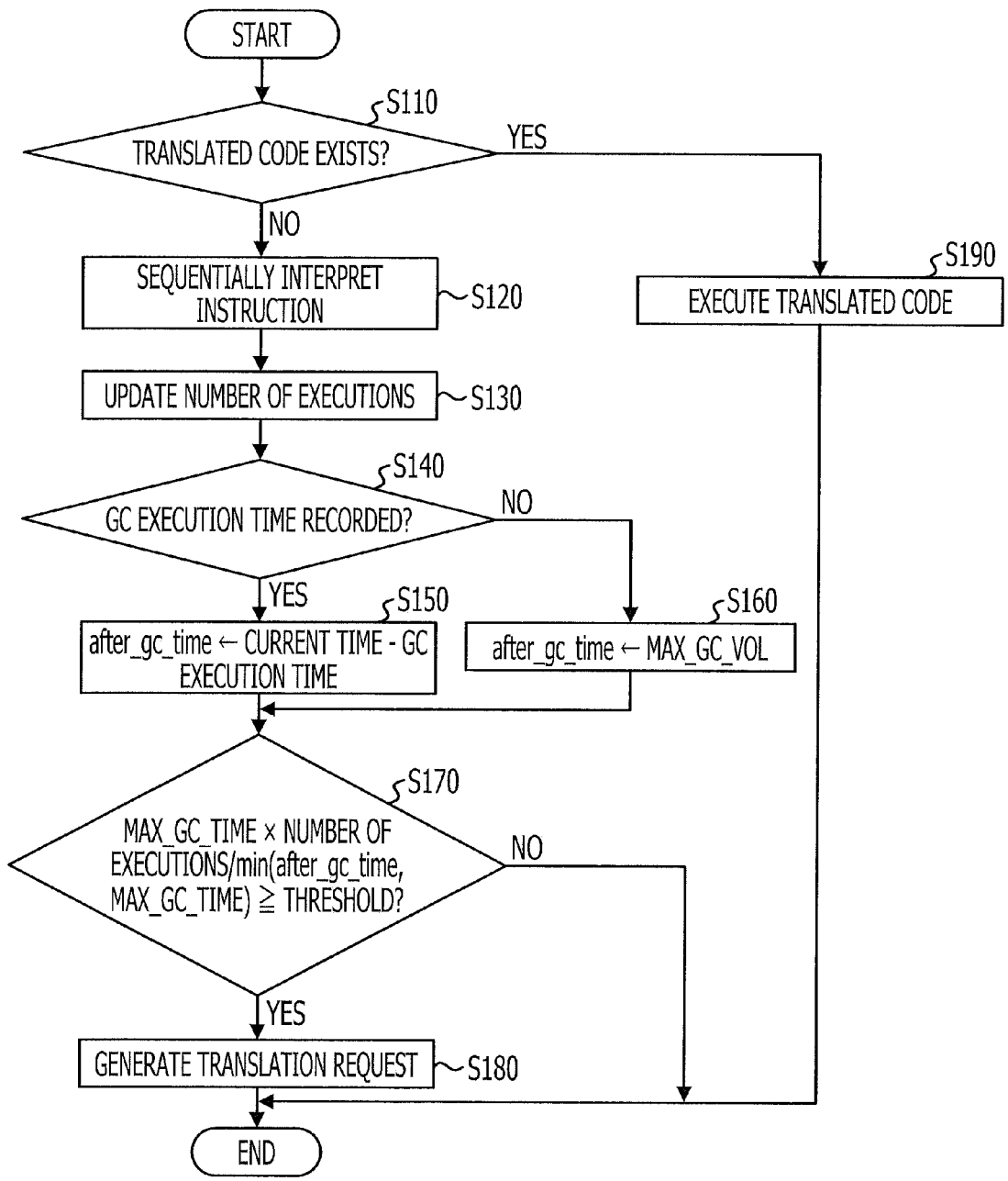
FIG. 5 is a flowchart depicting an example of a processing procedure of a sequential interpreter according to the first embodiment.

The processing procedure of the sequential interpreter 11 in FIG. 3 will be described in further detail. FIG. 5 is a flowchart depicting an example of the processing procedure of the sequential interpreter 11 according to the first embodiment. FIG. 5 illustrates the processing procedure performed when the instruction read is a branch instruction.

The sequential interpreter 11 refers to the management table 14Ta and determines whether or not translated code for a branch destination address that corresponds to the branch instruction exists (S110). If a record corresponding to the branch destination address exists in the management table 14Ta and if the value of the translated/untranslated flag corresponding to the record is "true", the sequential interpreter 11 determines that the translated code exists. If a record corresponding to the branch destination address does not exist in the management table 14Ta or if a record corresponding to the branch destination address exists in the management table 14Ta and the value of the translated/untranslated flag corresponding to the record is "false", the sequential interpreter 11 determines that the translated code does not exist.

If the translated code does not exist (No in S110), the sequential interpreter 11 sequentially interprets one or more instructions associated with the branch destination address, and causes the CPU 104 to execute the interpreted instruction (S120). Subsequently, the sequential interpreter 11 adds 1 to the number of executions in a record corresponding to the branch destination address in the management table 14Ta (S130). If a record corresponding to the branch destination address does not exist, the sequential interpreter 11 adds a record corresponding to the branch destination address in the management table 14Ta, and records 1 in the number of executions corresponding to the record. The number of executions in S170, described below, is equal to the number of executions updated or recorded in S130.

Subsequently, the sequential interpreter 11 determines whether or not the GC execution time has been recorded in the memory device 103 (S140). That is, whether or not GC has been executed after the execution of the target program being executed Tp was started is determined. If the GC execution time has been recorded in the memory device 103 (that is, if GC has been executed) (Yes in S140), the sequential interpreter 11 calculates the difference between the current time and the GC execution time (that is, the elapsed time after the GC execution time) (S150). The calculation result is assigned to a variable named after_gc_time. If the GC execution time has not been recorded in the memory device 103 (that is, if GC has not been executed) (No in S140), the sequential interpreter 11 assigns MAX_GC_TIME to the variable after_gc_time (S160). MAX_GC_TIME represents a period of time after the execution of GC during which the threshold for the number of executions is reduced. This period of time (MAX_GC_TIME) is determined in advance, and is recorded in, for example, the auxiliary storage device 102.

After S150 or S160 is completed, the sequential interpreter 11 determines whether or not a value represented by expression (1) below is greater than or equal to a threshold (S170):

$$\text{MAX\_GC\_TIME} \times \text{number of executions}/\min(\text{after\_gc\_time}, \text{MAX\_GC\_TIME}), \quad (1)$$

where min(x, y) denotes the minimum value of x and y. If after_gc_time <MAX_GC_TIME (that is, if the elapsed time after the GC execution time is less than MAX_GC_TIME), the value of min (after_gc_time, MAX_GC_TIME) is after_gc_time. If after_gc_time ≥MAX_GC_TIME (that is, if the elapsed time after the GC execution time is greater than or equal to MAX_GC_TIME), the value of min(after_gc_time, MAX_GC_TIME) is MAX_GC_TIME.

Accordingly, in S170, if the elapsed time after the GC execution time is less than MAX_GC_TIME, the value represented by expression (1) is larger than the actual number of executions. If the elapsed time after the GC execution time is greater than or equal to MAX_GC_TIME, the value represented by expression (1) is equal to the actual number of executions. Therefore, if the elapsed time after the GC execution time is less than MAX_GC_TIME, the threshold is effectively reduced, and the shorter the elapsed time, the larger the effective reduction to the threshold. If the elapsed time after the GC execution time is greater than or equal to MAX_GC_TIME, the threshold is equal to the original value.

If the value represented by expression (1) is greater than or equal to the threshold (Yes in S170), the sequential interpreter 11 generates a translation request in which the branch destination address is specified, and enters the translation request in the translation request queue 12 (S180), If the value represented by expression (1) is less than the threshold (No in S170), S180 is skipped.

If translated code for the branch destination address exists (Yes in S110), the sequential interpreter 11 causes the CPU 104 to execute the translated code stored at the translated code address in the management table 14Ta associated with the branch destination address (S190).

In the foregoing description, by way of example, the GC execution time is recorded. Alternatively, a timer for measuring a time may be used. In this case, in S14 in FIG. 3, the translated code remover 15 initializes the value of the timer to 0. In S150 in FIG. 5, the sequential interpreter 11 assigns the current value of the timer to after_gc_time.

Next, a second embodiment will be described. The following description will be given of portions of the second embodiment different from those of the first embodiment. For other details not described here, reference may be made to the description of the first embodiment.

Figure 6:
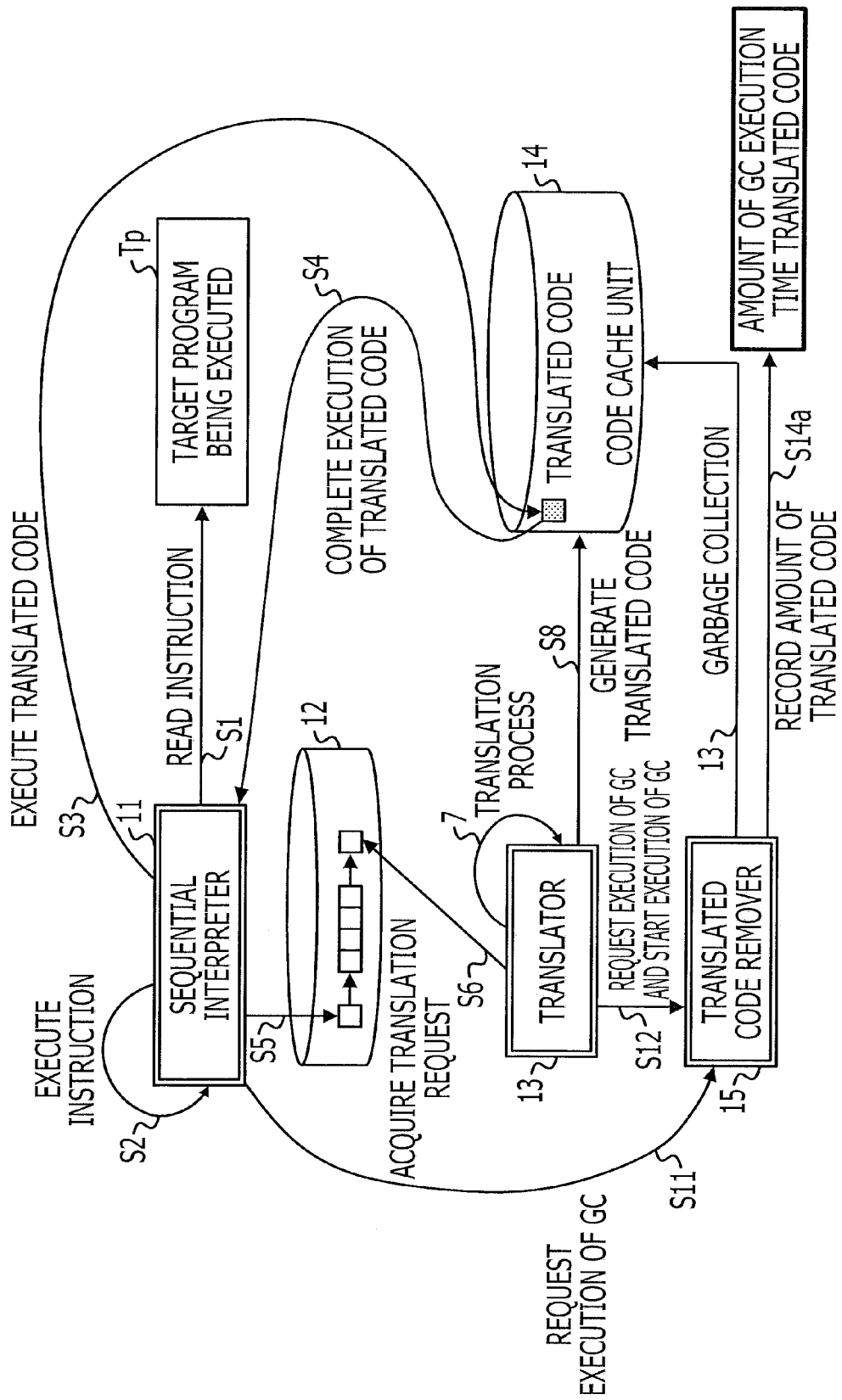
FIG. 6 is a diagram depicting an example of a processing procedure executed by an information processing apparatus according to a second embodiment.

FIG. 6 is a diagram depicting an example of a processing procedure executed by an information processing apparatus according to the second embodiment. In FIG. 6, portions that are substantially the same as those in FIG. 3 are designated by the same reference signs, and a description thereof is omitted.

In FIG. 6, S14a replaces S14 in FIG. 3. In S14a, the translated code remover 15 records the amount of translated code remaining in the code cache unit 14 at the time of execution of GC (that is, at a time substantially immediately after the execution of GC) (hereinafter referred to as the "amount of translated code at GC execution time") in, for example, the memory device 103.

The amount of translated code at GC execution time may be used to allow the sequential interpreter 11 to dynamically change the threshold for the number of executions. In S2 in FIG. 6, the sequential interpreter 11 reduces the threshold until the amount of translated code generated changes from the amount of translated code at GC execution time to a given amount of translated code (that is, until the amount of translation performed after the execution of GC has become a given value). Consequently, advantages similar to those in the first embodiment may be achieved. In this manner, the given period of time after the execution of GC may be measured using, instead of time, any other index that changes with time, such as an amount of translated code.

Figure 7:
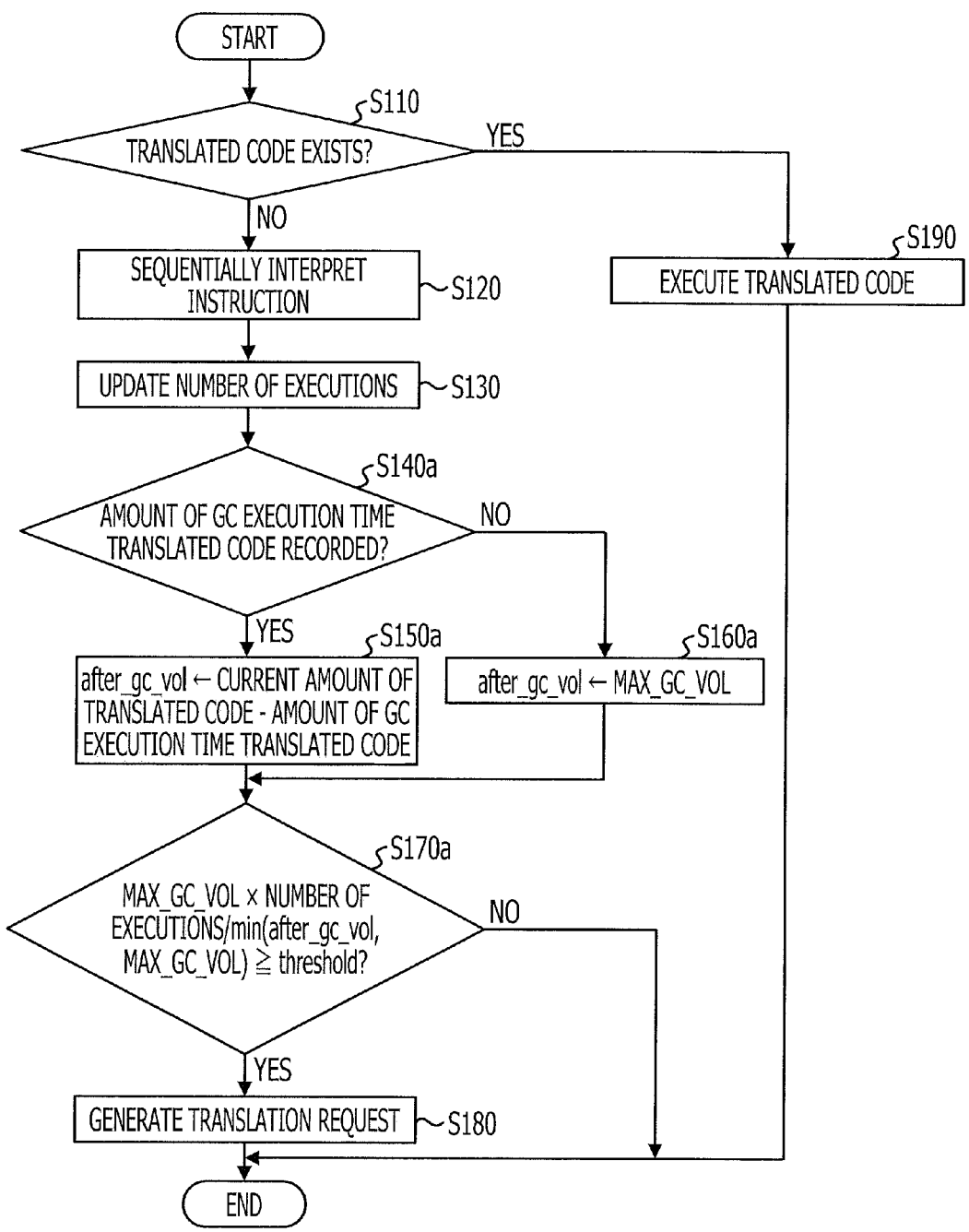
FIG. 7 is a flowchart depicting an example of a processing procedure of a sequential interpreter according to the second embodiment.

The processing procedure according to the first embodiment illustrated in FIG. 5 may be replaced by that illustrated in FIG. 7. FIG. 7 is a flowchart depicting an example of a processing procedure of a sequential interpreter 11 according to the second embodiment. In FIG. 7, portions that are substantially the same as those in FIG. 5 are designated by the same reference signs, and a description thereof is omitted. In FIG. 7, S140a, S150a, S160a, and S170a replace S140, S150, S160, and S170 in FIG. 5, respectively.

In S140a, the sequential interpreter 11 determines whether or not the amount of translated code at GC execution time has been recorded in the memory device 103. If the amount of translated code at GC execution time has been recorded in the memory device 103 (that is, if GC has been executed) (Yes in S140a), the sequential interpreter 11 calculates the difference between the current amount of translated code in the code cache unit 14 and the amount of translated code at GC execution time (that is, the amount of translated code that has been obtained since the time of execution of GC) (S150a). The calculation result is assigned to a variable named after_gc_vol.

If the amount of translated code at GC execution time has not been recorded in the memory device 103 (that is, if GC has not been executed) (No in S140a), the sequential interpreter 11 assigns MAX_GC_VOL to the variable after_gc_vol (S160a). In the second embodiment, as described above, the threshold is effectively reduced until the amount of translation performed after the execution of GC has become a given value. The given value may be MAX_GC_VOL. MAX_GC_VOL is determined in advance, and is recorded in, for example, the auxiliary storage device 102.

After S150a or S160a is completed, the sequential interpreter 11 determines whether or not the value represented by expression (2) below is greater than or equal to a threshold (S170a):

$$\text{MAX\_GC\_VOL} \times \text{number of executions}/\min(\text{after\_gc\_vol}, \text{MAX\_GC\_VOL}). \quad (2)$$

Expression (2) is obtained by replacing after_gc_time and MAX_GC_TIME in expression (1) in the first embodiment by after_gc_vol and MAX_GC_VOL, respectively. Therefore, if the amount of translated code that has been obtained since the time of execution of GC is less than MAX_GC_VOL, the threshold is effectively reduced, and the smaller the amount of translated code that has been obtained since the time of execution of GC, the greater the effective reduction to the threshold. If the amount of translated code that has been obtained since the time of execution of GC is greater than or equal to MAX_GC_VOL, the threshold is equal to the original value.

In the first and second embodiments, if the elapsed time after the GC execution time is less than MAX_GC_TIME or if the amount of translated code that has been obtained since the time of execution of GC is less than MAX_GC_VOL, the value represented by expression (1) or (2) may a fixed value. In this case, for example, the value after_gc_time in expression (1) or the value after_gc_vol in expression (2) may be given by MAX_GC_TIME/n or MAX_GC_VOL/n, where n>1. As a result, if the elapsed time after the GC execution time is less than MAX_GC_TIME or if the amount of translated code that has been obtained since the time of execution of GC is less than MAX_GC_VOL, the degree to which the threshold is reduced may be a given value.

In the first and second embodiments, furthermore, an example in which a threshold is reduced by overestimating the number of executions of an instruction over a given period of time has been described, but the threshold may be dynamically changed. For example, the threshold may be changed in accordance with the number of translation requests stored in the translation request queue 12. In this case, the threshold used in S170 or S170a may be calculated using, for example, the following expression (3).

$$\text{Threshold} = (\text{number of translation requests stored in the translation request queue 12} \times \text{constant } A) + \text{constant } B \quad (3)$$

The threshold may be calculated by applying, for example, constant A=1024 and constant B=1 to expression (3).

Next, a third embodiment will be described. The following description will be given for portions of the third embodiment different from those of the first embodiment. For other details not described here, reference may be made to the description of the first embodiment.

In the third embodiment, that an inconsistency may occur between translated code and a target program being executed Tp is taken into account. The occurrence of such an inconsistency is particularly apparent when the target program being executed Tp is a program for emulating a CPU with a different architecture from the CPU 104. That is, the third embodiment is suitable when the target program being executed Tp, the sequential interpreter 11, the code cache unit 14, and the translated code remover 15 function as an emulator for emulating a CPU with a different architecture from the CPU 104. However, the third embodiment may be applied in other cases.

Figure 8:
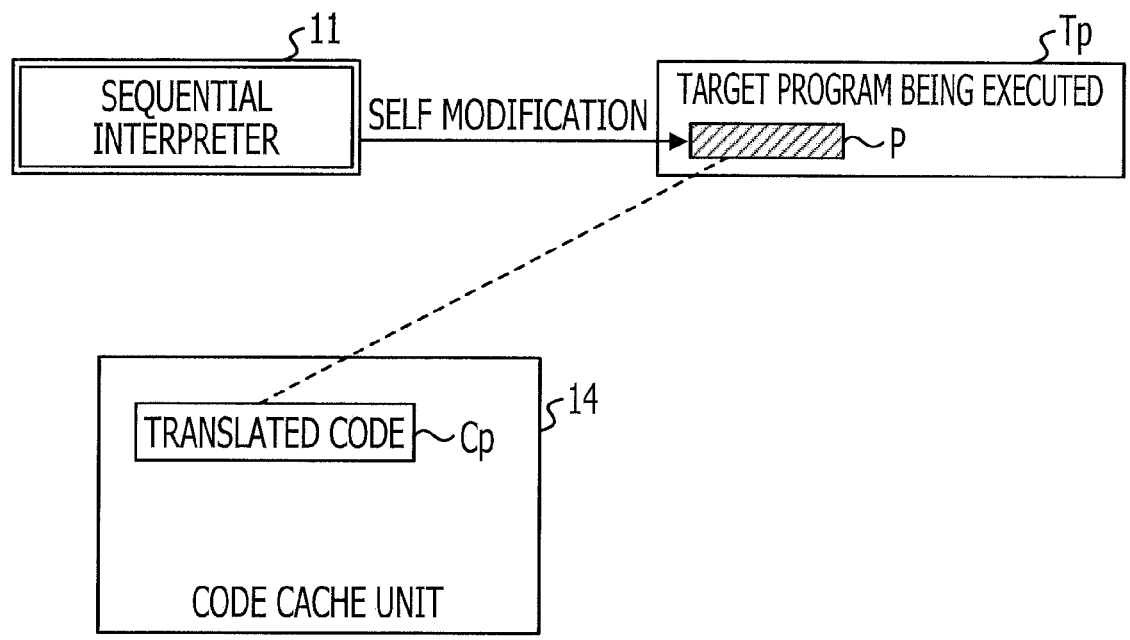
FIG. 8 is a diagram depicting an example situation where an inconsistency in translated code occurs.

An inconsistency in translated code occurs, for example, in a situation as illustrated in FIG. 8. FIG. 8 is a diagram depicting an example situation where an inconsistency in translated code occurs.

In FIG. 8, an example of self modification is illustrated. An instruction P that is part of a target program being executed Tp may be dynamically altered or modified due to the execution of an instruction in the target program being executed Tp (sequential execution or execution using translated code that includes the instruction). Modification of an instruction in a program by the program itself when the program is being executed is referred to as "self modification". In FIG. 8, translated code Cp that includes the instruction P, which has been modified, is different to the current state of the target program being executed Tp. Thus, an inconsistency has occurred in the translated code Cp.

Avoiding execution of the translated code Cp in which an inconsistency has occurred is desirable. Accordingly, the sequential interpreter 11 associates information indicating invalidity with the translated code Cp in which an inconsistency has occurred. In order to associate the information indicating invalidity, a management table 14Tb according to the third embodiment has, for example, a configuration as illustrated in FIG. 9.

FIG. 9 is a diagram illustrating an example configuration of the management table 14Tb according to the third embodiment. In FIG. 9, the management table 14Tb stores an invalidation flag in association with an address. The "invalidation flag" is information indicating whether or not translated code associated with the address is invalid. The initial value of the invalidation flag is "false". If an inconsistency has occurred or could have occurred in the translated code, the value of the invalidation flag is updated to "true". In this embodiment, the update of the invalidation flag to "true" for translated code is referred to as "invalidation of the translated code".

If the value of the invalidation flag for a branch destination address is "true", the sequential interpreter 11 sequentially executes each branch destination instruction corresponding to the branch destination address without regarding the translated code as code to be executed.

In this embodiment, the sequential interpreter 11 updates the invalidation flag. In order to detect an inconsistency occurring in a block of translated code, the sequential interpreter 11 or the translator 13 sets page table access privilege to "Read Only" for a page of the target program being executed Tp to which an instruction whose translated code has been generated belongs. That is, writing to the page of the target program being executed Tp to which an instruction whose translated code has been generated belongs is prohibited. Afterwards, if a page of the target program being executed Tp to which an instruction whose translated code has been generated belongs is to be self-modified by the execution of an instruction in the target program being executed Tp, an exception regarding access violation occurs. The sequential interpreter 11 detects the occurrence of the exception through a handler for handling (catching) the exception. Upon detection of the occurrence of the exception, the sequential interpreter 11 updates the invalidation flag in the management table 14Tb to "true" for the one or more addresses associated with the translated code belonging to a page that includes the address notified with the exception.

An inconsistency in translated code may also occur in response to a desire to change mapping between virtual addresses and physical addresses such as when a new process is generated or when swapping has occurred. In response to the desire, the sequential interpreter 11 sets the invalidation flag for affected translated code to "true".

Here, the relationship between invalidated translated code and GC, and translated code that has not been invalidated (effective translated code) and GC will be described. Invalidated translated code is undesirable translated code that is not usable later. Therefore, difficulties in performance caused by executing GC for the invalidated translated code may be relatively small. In contrast, effective translated code is translated code that is usable later or might be used later. Therefore, difficulties in performance caused by executing GC for the effective translated code may be relatively high.

In light of the above description, in the third embodiment, thresholds for the number of executions after the execution of GC may differ between invalidated translated code and effective translated code. Specifically, the threshold for effective translated code may be reduced to provide earlier recovery.

Figure 10:
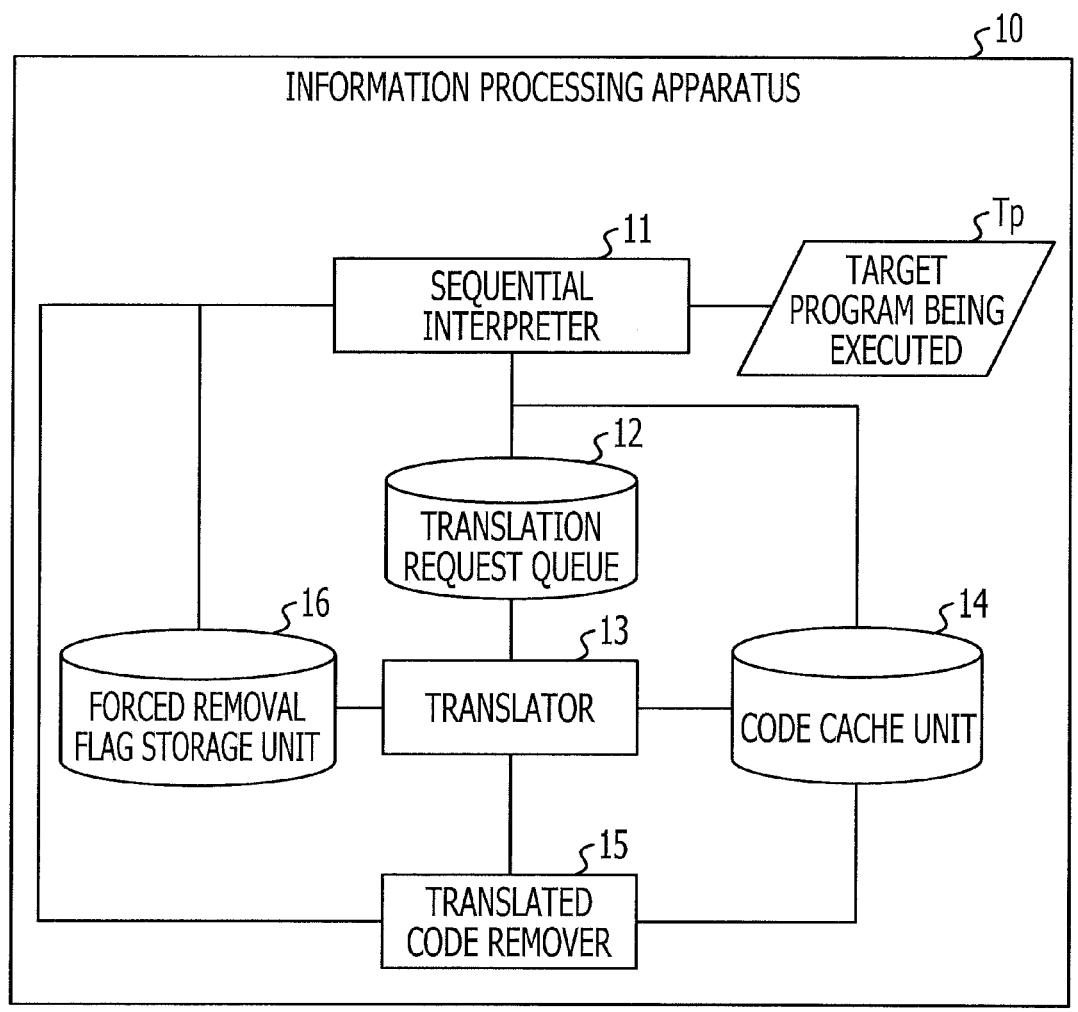
FIG. 10 is a diagram illustrating an example functional configuration of an information processing apparatus according to the third embodiment.

In order to realize the above control, an information processing apparatus 10 according to the third embodiment has, for example, a functional configuration as illustrated in FIG. 10.

FIG. 10 is a diagram illustrating an example functional configuration of the information processing apparatus 10 according to the third embodiment. In FIG. 10, the information processing apparatus 10 further includes a forced removal flag storage unit 16. The forced removal flag storage unit 16 may be implemented using; for example, the memory device 103 or the auxiliary storage device 102.

The forced removal flag storage unit 16 stores information (hereinafter referred to as the "forced removal flag") for identifying effective translated code that has been forced to be removed by the execution of GC. However, management of the forced removal flag for each piece of translated code leads to an increase in the amount of management information. In this embodiment, the forced removal flag is managed for each page of the target program being executed Tp.

Figure 11:
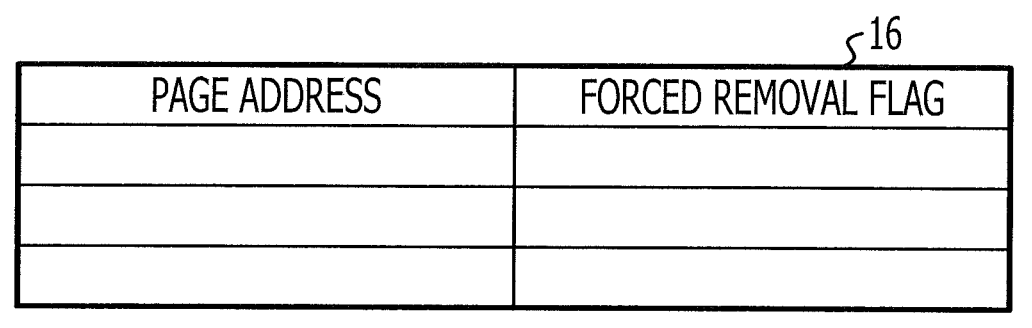

FIG. 11 is a diagram illustrating an example configuration of the forced removal flag storage unit 16. As illustrated in FIG. 11, the forced removal flag storage unit 16 stores a forced removal flag for each page address. The page address is the start address of each page. Since the size of each page is given, a range of each page is specified based on the start address. The size of each page may not match the size of each page that is managed by an operating system (OS).

At the GC execution time, the value "false" is recorded in the forced removal flag for pages including translated code that had already been invalidated, and the value "true" is recorded in the forced removal flag for pages including only effective translated code. The forced removal flag is an example of information that indicates translated code whose instructions have not been updated in the target program being executed Tp after the generation of the translated code.

Figure 12:
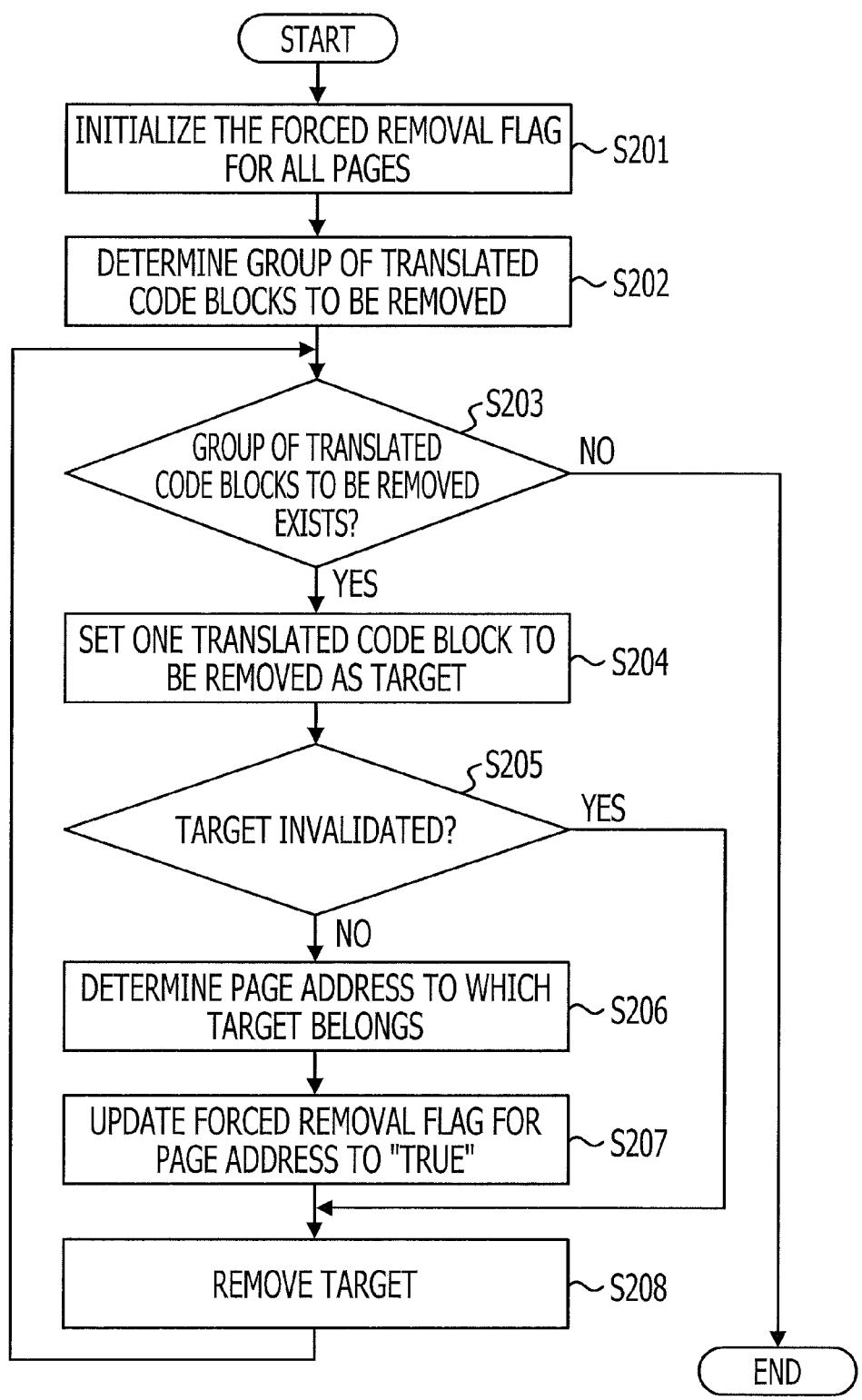
FIG. 12 is a flowchart depicting an example of a processing procedure for a process for executing GC according to the third embodiment.

A processing procedure according to the third embodiment will now be described. FIG. 12 is a flowchart depicting an example of a processing procedure for a process for executing GC according to the third embodiment. FIG. 12 illustrates a process which is executed in a single GC run (that is, in one execution of S13 in FIG. 3).

In S201, the translated code remover 15 initializes the values of the forced removal flag for all the page addresses in the forced removal flag storage unit 16 to "false". Subsequently, the translated code remover 15 determines a group of translated code blocks to be removed (S202). The group of translated code blocks to be removed may be determined using an existing method. Some or all of all the translated code may be determined to be removed.

If a group of translated code blocks to be removed exists (Yes in S203), the translated code remover 15 sets one translated code block in the group of translated code blocks as a target to be processed (hereinafter referred to as the "target translated code block") (S204). Subsequently, the translated code remover 15 refers to the invalidation flag in the management table 14Tb for the record corresponding to the target translated code block, and determines whether or not the target translated code block has been invalidated (S205). That is, whether the invalidation flag is "true" or "false" is checked.

If the target translated code block has not been invalidated (No in S205), the translated code remover 15 determines the address of one or more pages to which the target translated code block belongs among the pages of the target program being executed Tp (S206). Subsequently, the translated code remover 15 updates the value of the forced removal flag in the forced removal flag storage unit 16 for the address of the one or more pages to "true" (S207). That is, information about the target translated code block, indicating that the instruction corresponding to the target translated code block has not been updated in the target program being executed Tp after the generation of the target translated code block, is recorded in the forced removal flag storage unit 16. The term "update", as used herein, refers to update made by, for example, self modification.

Subsequently, the translated code remover 15 removes data such as the target translated code block, and the record in the management table 14Tb corresponding to the target translated code block from the code cache unit 14 (S208). If the target translated code block has been invalidated (Yes in S205), the target translated code block and the corresponding information are removed without updating the forced removal flag (S208).

Subsequently, the translated code remover 15 repeatedly performs S203 and the subsequent processing thereof on all the translated code blocks belonging to the group of translated code blocks to be removed.

As a result of the process illustrated in FIG. 12, the forced removal flag storage unit 16 stores the value "true" for the page or pages including only effective translated code.

Figure 13:
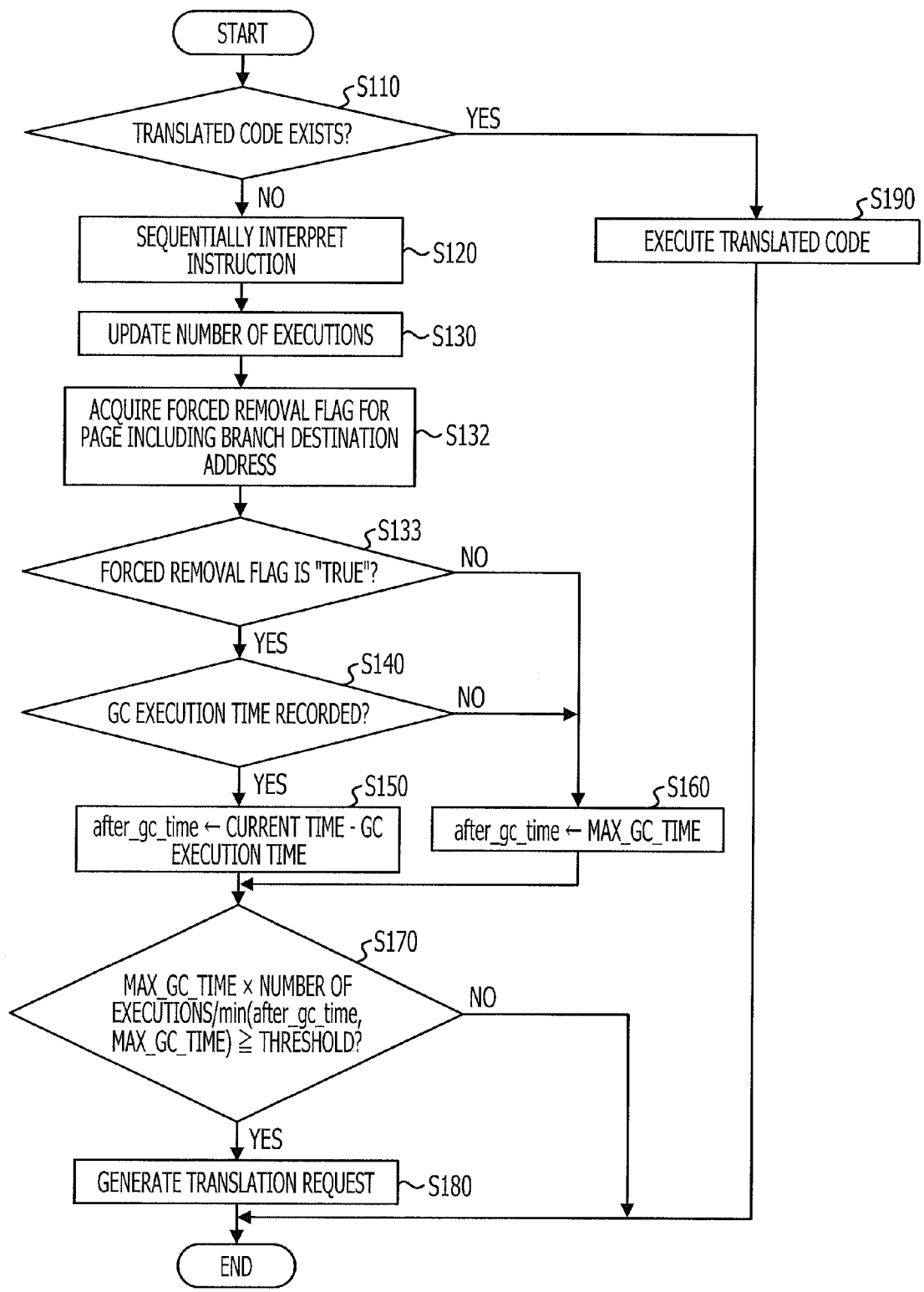
FIG. 13 is a flowchart depicting an example of the processing procedure of a sequential interpreter according to the third embodiment.

Next, a processing procedure of the sequential interpreter 11 according to the third embodiment will be described. FIG. 13 is a flowchart depicting an example of the processing procedure of the sequential interpreter 11 according to the third embodiment. In FIG. 13, portions that are substantially the same as those in FIG. 5 are designated by the same reference signs, and a description thereof is omitted. In FIGS. 13, S132 and S133 have been added.

In S132, the sequential interpreter 11 acquires from the forced removal flag storage unit 16 the value of the forced removal flag for a page that includes the branch destination address. If the acquired value of the forced removal flag is "true" (Yes in S133), S140 and the subsequent processing thereof are executed. That is, the threshold is reduced over a given period of time after the execution of GC. If the acquired value of the forced removal flag is "false" (No in S133), S160 and the subsequent processing thereof are executed. That is, the threshold may not be reduced.

Note that S140, S150, S160, and S170 in FIG. 13 may also be replaced by S140a, S150a, S160a, and S170a in FIG. 7, respectively. That is, as in the second embodiment, the given period of time after the execution of GC may be measured using the amount of translated code.

In the foregoing description, by way of example, the forced removal flag is managed for each page. Alternatively, the forced removal flag may be managed for each piece of translated code (for each branch destination address). In this case, the thresholds of invalidated translated code and effective translated code may be changed in more detail.

According to the third embodiment, therefore, the time of recovery for translated code that might be used after the execution of GC may be accelerated compared to that for translated code that might not be used. Thus, the period of time over which the low performance caused by the removal of translated code continues may be reduced.

Next, a fourth embodiment will be described. The following description will be given of portions of the fourth embodiment different from those of the first embodiment. For other details not described here, reference may be made to the description of the first embodiment.

Figure 14:
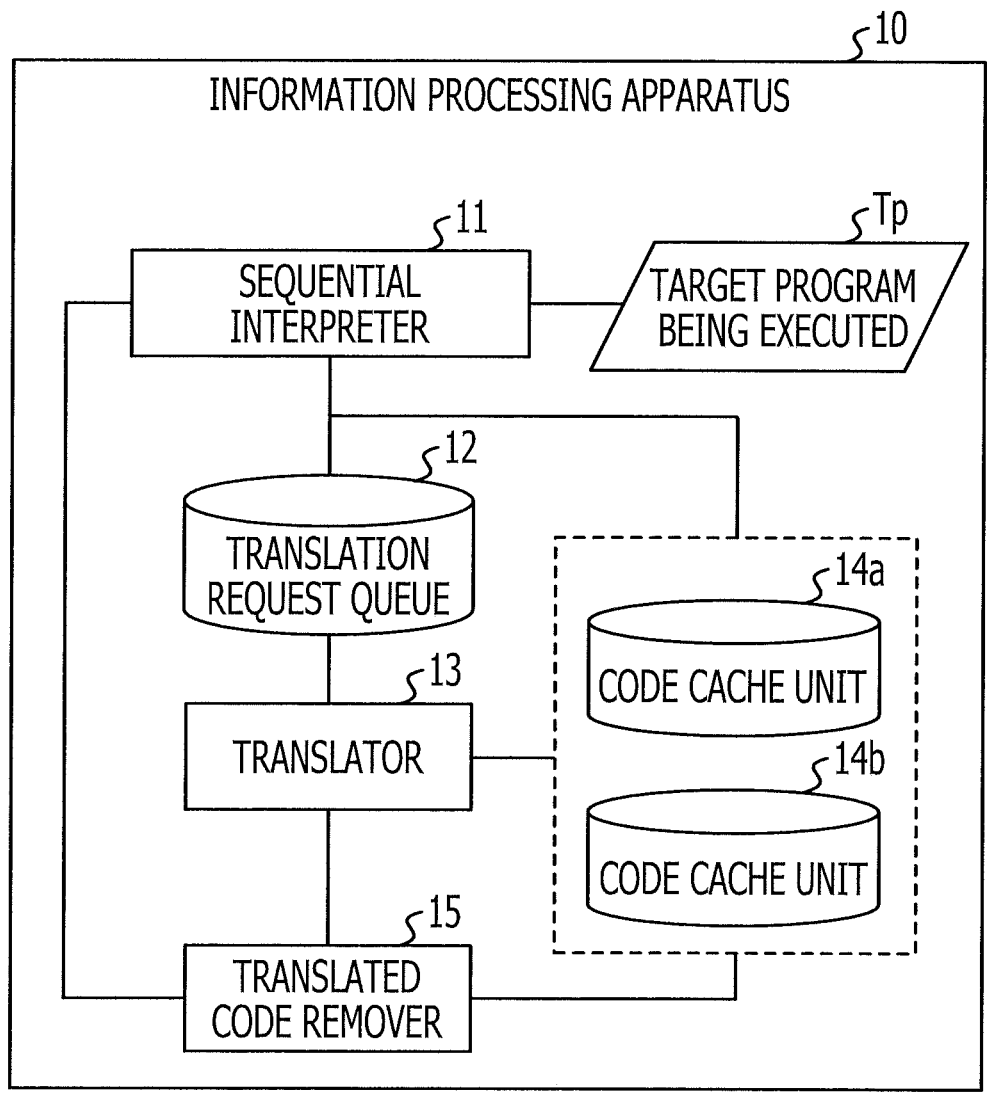
FIG. 14 is a diagram illustrating an example functional configuration of an information processing apparatus according to a fourth embodiment.

FIG. 14 is a diagram illustrating an example functional configuration of an information processing apparatus 10 according to the fourth embodiment. In FIG. 14, the information processing apparatus 10 includes two code cache units: a code cache unit 14a and a code cache unit 14b.

The code cache units 14a and 14b may be implemented by dividing the code cache unit 14 according to the first embodiment into two sections, or may be two code cache units each corresponding to the code cache unit 14 according to the first embodiment.

Figure 15:
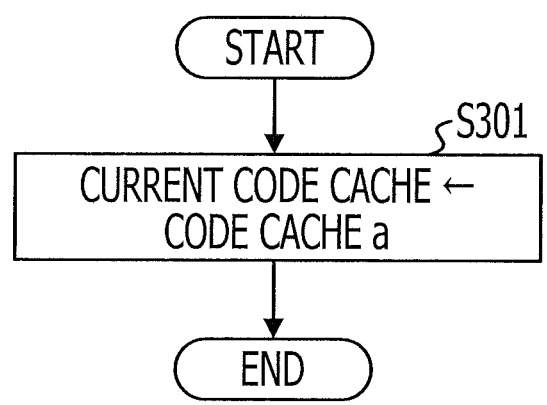
FIG. 15 is a diagram illustrating an example of a processing procedure for an initialization process of a translated code remover according to the fourth embodiment.

A processing procedure according to the fourth embodiment will now be described. FIG. 15 is a diagram illustrating an example of a processing procedure for an initialization process of a translated code remover 15 according to the fourth embodiment. The processing procedure illustrated in FIG. 15 is executed when the translated code remover 15 is initially started for a single execution of the target program being executed Tp.

In S301, the translated code remover 15 records information indicating that the code cache unit 14a is a current code cache in the memory device 103. For example, the start address of the code cache unit 14a is assigned to a variable for specifying the current code cache. The term "current code cache" is used to refer to a code cache unit being used.

Figure 16:
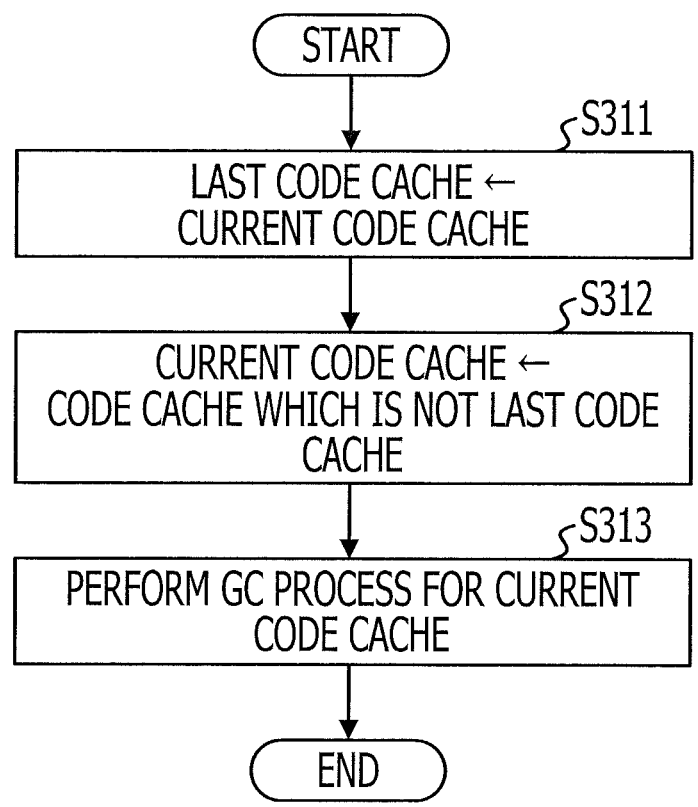
FIG. 16 is a flowchart depicting an example of a processing procedure for a process for executing GC according to the fourth embodiment.

FIG. 16 is a flowchart depicting an example of a processing procedure for a process for executing. GC according to the fourth embodiment. FIG. 16 illustrates a process executed in one GC run (that is, during one execution of S13 in FIG. 3).

In S311, the translated code remover 15 records information indicating that the current code cache is the last code cache in the memory device 103. For example, the value of a variable for specifying the current code cache is assigned to a variable for specifying the last code cache. The term "last code cache" is used to refer to a code cache unit that was last used.

Subsequently, the translated code remover 15 records information indicating that one of the code cache units 14a and 14b which is not the last code cache is the current code cache in the memory device 103 (S312). That is, in S311 and S312, the current code cache and the last code cache are interchanged. Specifically, one of the code cache units 14a and 14b which has not been being used since the previous execution of GC is set as the code cache unit to use (that is, the current code cache).

Subsequently, the translated code remover 15 executes GC for the current code cache (S313).

For example, assume that the code cache unit 14a is the current code cache at the time of the start of the processing procedure illustrated in FIG. 16. Since the code cache unit 14a has been used until the execution of GC, translated code, a management table 14Ta, and any other suitable information has been recorded on the code cache unit 14a.

Through the execution of S311 and S312, the code cache unit 14a becomes the last code cache, and the code cache unit 14b becomes the current code cache. Therefore, in S313, GC is performed on the code cache unit 14b. Consequently, the content recorded on the code cache unit 14a is saved (or stored).

In the fourth embodiment, therefore, the content recorded on the current code cache is saved until GC is executed.

Figure 17:
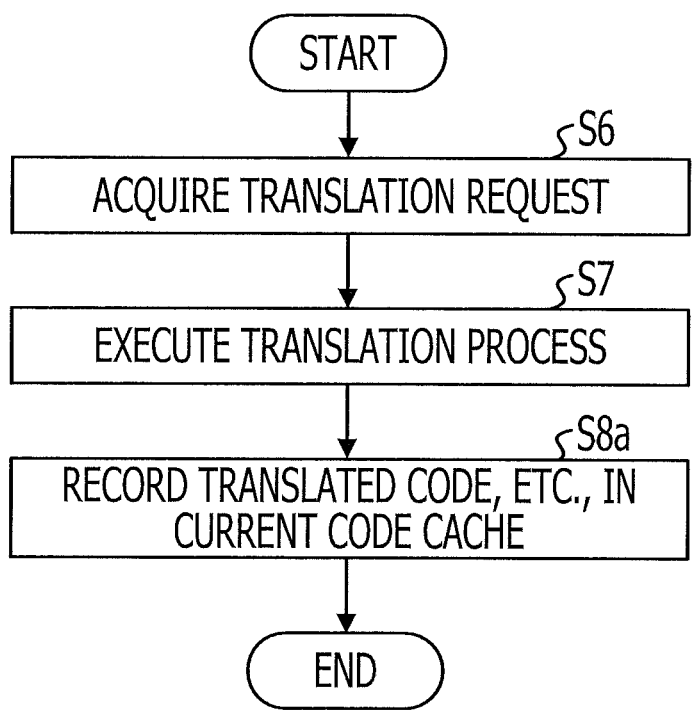
FIG. 17 is a flowchart depicting an example of a processing procedure of a translator according to the fourth embodiment.

FIG. 17 is a flowchart depicting an example of a processing procedure of a translator 13 according to the fourth embodiment. In FIG. 17, portions that are substantially the same as those in FIG. 3 (i.e., S6 and S7) are designated by the same reference signs, and a description thereof is omitted.

In FIG. 17, S8a is executed instead of S8. In S8a, the translator 13 stores the generated translated code in the current code cache. In the management table 14Ta of the current code cache, the translator 13 further updates the value of the translated/untranslated flag corresponding to an address specified in the translation request to "true", and records an address at which the translated code is stored in the translated code address corresponding to the address specified in the translation request.

Figure 18:
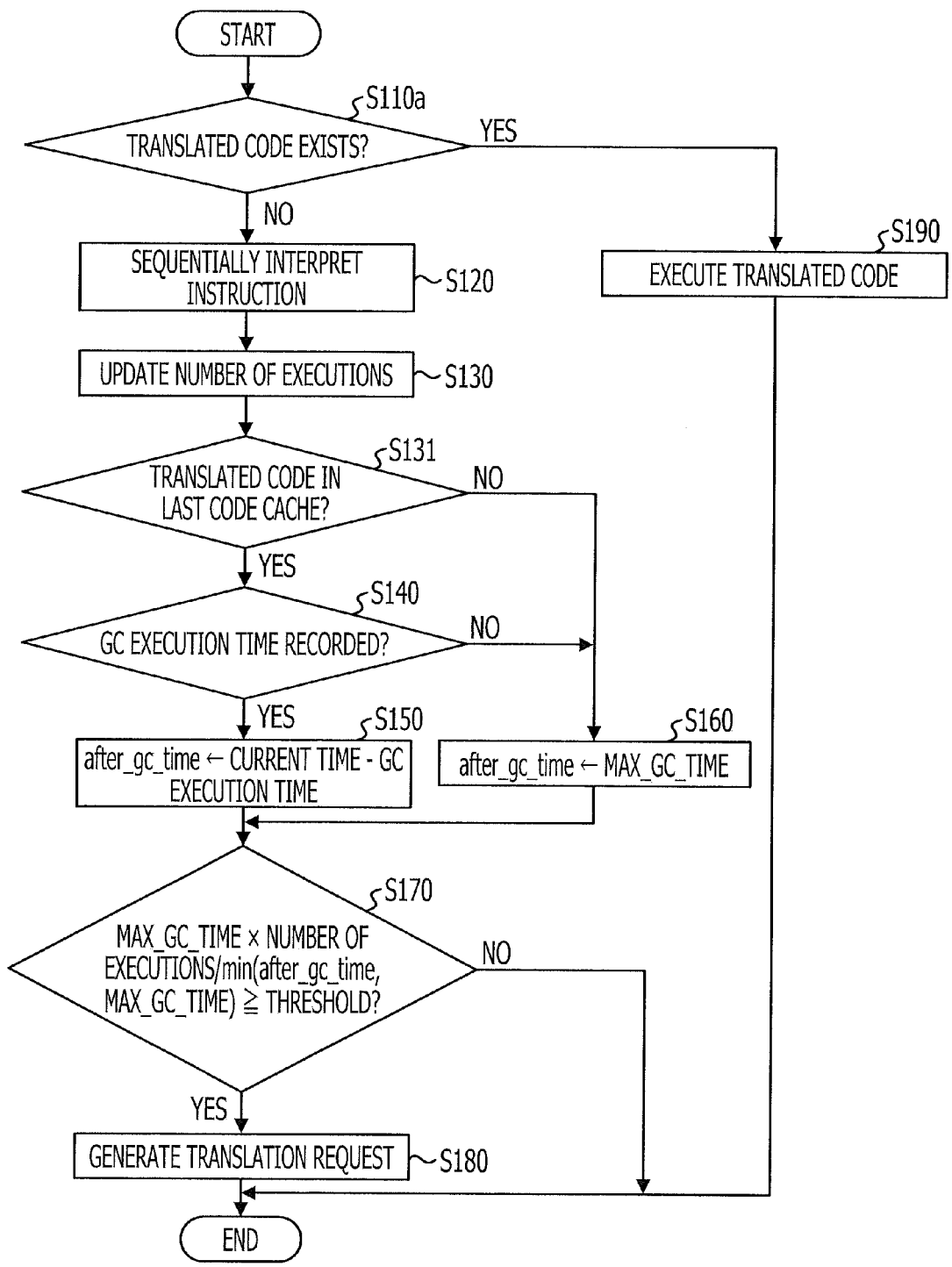
FIG. 18 is a flowchart depicting an example of a processing procedure of a sequential interpreter according to the fourth embodiment.

FIG. 18 is a flowchart depicting an example of a processing procedure of a sequential interpreter 11 according to the fourth embodiment. In FIG. 18, portions that are substantially the same as those in FIG. 5 are designated by the same reference signs, and a description thereof is omitted. In FIG. 13, S110a replaces S110 in FIG. 5 and S131 has been added.

In S110a, the sequential interpreter 11 refers to the management table 14Ta in the current code cache, and determines whether or not translated code for a branch destination address exists.

In S131, the sequential interpreter 11 refers to the management table 14Ta in the last code cache, and determines whether or not translated code for the branch destination address exists. If translated code for the branch destination address exists in the last code cache (Yes in S131), S140 and the subsequent processing thereof are executed. That is, the threshold is reduced over a given period of time after the execution of GC. If the translated code for the branch destination address does not exist in the last code cache (No in S131), S160 and the subsequent processing thereof are executed. That is, the threshold may not be reduced.

Note that S140, S150, S160, and S170 in FIG. 18 may be replaced by S140a, S150a, S160a, and S170a in FIG. 7, respectively. That is, as in the second embodiment, the given period of time after the execution of GC may be measured using the amount of translated code.

In the foregoing description, an example was depicted of saving the current code cache's content by interchanging the code cache unit 14a and 14b with respect to the current code cache and the last code cache. Instead, the code cache unit 14a may be set to always be the target of use (that is, the current code cache). In this case, a process for copying the content in the code cache unit 14a to the code cache unit 14b may be executed instead of S311 and S312 in FIG. 16. Consequently, the content in the code cache unit 14a before the execution of GC may be saved. Not saving the entirety of the content stored in the current code cache is acceptable. Information capable of identifying a group of instructions for which translated code has been generated may be saved. In this embodiment, the value of the addresses in the management table 14Ta may be saved.

According to the fourth embodiment, therefore, the threshold of a group of instructions for which translated code has previously been generated may be reduced. Thus, the group of instructions may be preferentially translated. A group of instructions for which translated code has previously been generated may tend to have a high frequency of execution. Accelerated re-generation of translated code for the group of instructions may reduce the period of time during which there is low performance caused by the removal of translated code.

In addition, an increase in the amount of translated code may be restrained compared to the case where thresholds of all the groups of instructions are uniformly reduced.

In S131, whether or not the number of executions for a branch destination address is greater than or equal to a threshold a instead of whether or not translated code for the branch destination address exists may be determined. If the number of executions for the branch destination address is greater than or equal to the threshold $\alpha$, S140 and the subsequent processing thereof may be executed. If the number of executions for the branch destination address is less than the threshold $\alpha$, S160 and the subsequent processing thereof may be executed. Therefore, the range of instructions to be translated may be limited to a group of instructions with a higher frequency of execution. In this case, a value representing the number of executions for the translated code corresponding to the branch destination address, in addition to the value of the address in the management table 14Ta, may be saved. The threshold a may or may not be the same as the threshold used in S170.

Next, a fifth embodiment will be described. The fifth embodiment is a combination of the third embodiment and the fourth embodiment. A sequential interpreter 11 according to the fifth embodiment executes a process illustrated in FIG. 19.

Figure 19:
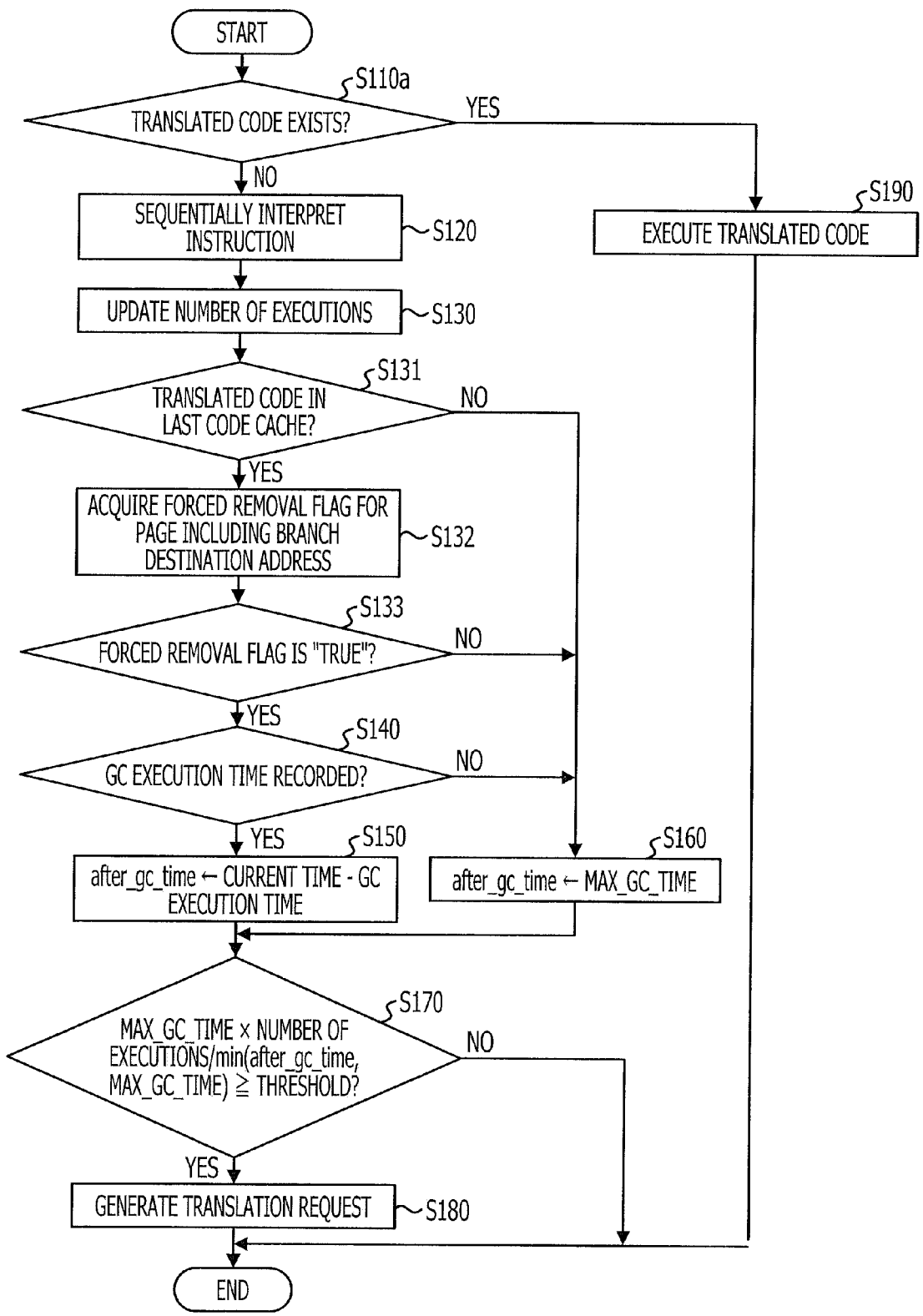
FIG. 19 is a flowchart depicting an example of a processing procedure of a sequential interpreter according to a fifth embodiment.

FIG. 19 is a flowchart depicting an example of a processing procedure of the sequential interpreter 11 according to the fifth embodiment. In the processing procedure illustrated in FIG. 19, S132 and S133 from FIG. 16 are added after S131 from FIG. 18. The processing procedure illustrated in FIG. 19 may be anticipated from the description with reference to FIGS. 16 and 18 and any other suitable figure, and a description thereof is thus omitted.

According to the fifth embodiment, the advantages of both the third and fourth embodiments may be achieved.

In the foregoing embodiments, the translator 13 is an example of a generator. The translated code remover 15 is an example of a remover. The code cache unit 14 is an example of a first storage unit. The forced removal flag storage unit 16 is an example of a second storage unit.

While several embodiments have been described in detail, embodiments are not limited to the foregoing specific embodiments, and a variety of modifications and changes may be made within the scope of the disclosure as defined in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An instruction processing method comprising:
generating a translated code block for an instruction, among instructions included in a target program to be executed and for which a number of executions through sequential interpretation is greater than or equal to a threshold, and storing the generated translated code block in a first storage unit;
removing part or all of the translated code block from the first storage unit at an execution time;
determining an amount of time that has elapsed since the execution time and comparing the determined amount of time that has elapsed since the execution time with a predetermined amount of time;
when the amount of time that has elapsed since the execution time is less than the predetermined amount of time, reducing, using an information processing apparatus, the threshold with respect to the number of executions over a given period of time after the part or all of the translated code block is removed, an amount of reduction of the threshold being larger as the amount of time that has elapsed since the execution time becomes shorter; and
when the amount of time that has elapsed since the execution time is not less than the predetermined amount of time, maintaining the threshold.

2. The instruction processing method according to claim 1, wherein
the translated code block includes translated code blocks to be removed,
the removing stores, in a second storage unit, information indicating a translated code block, among the translated code blocks to be removed, for which no instruction corresponding to the translated code block in the target program to be executed is updated after the translated code block is generated, and
the generating reduces the threshold for the translated code block indicated by the information stored in the second storage unit, over a given period of time after the some or all of the one or more translated code blocks has been removed.

3. The instruction processing method according to claim 1, wherein
the removing saves identification information identifying an instruction corresponding to the translated code block, the instruction being stored in the first storage unit in association with the translated code block, and
the generating reduces the threshold for the instruction corresponding to the saved identification information, over a given period of time after the part or all of the translated code block is removed.

4. An instruction processing apparatus comprising:
a first memory; and
a processor configured to generate a translated code block for an instruction, included in a target program to be executed, for which the number of executions through sequential interpretation is greater than or equal to a threshold, to store the generated translated code block in a first memory, to remove part or all of a translated code block from the first memory at an execution time, and to determine an amount of time that has elapsed since the execution time and compare the determined amount of time that has elapsed since the execution time with a predetermined amount of time, wherein, when the amount of time that has elapsed since the execution time is less than the predetermined amount of time, the processor reduces the threshold with respect to the number of executions over a given period of time after the part or all of the translated code block is removed, an amount of reduction of the threshold being larger as the amount of time that has elapsed since the execution time becomes shorter, and when the amount of time that has elapsed since the execution time is not less than the predetermined amount of time, the processor maintains the threshold.

5. The instruction processing apparatus according to claim 4, wherein the translated code block includes translated code blocks to be removed, the remover stores, in a second memory, information indicating a translated code block, among the translated code blocks to be removed, for which no instruction corresponding to the translated code block in the target program to be executed is updated after the translated code block is generated, and the processor reduces the threshold for the translated code block indicated by the information stored in the second storage unit, over a given period of time after the part or all of the translated code block is removed.

6. The instruction processing apparatus according to claim 4, wherein the processor saves identification information identifying an instruction corresponding to the translated code block, the instruction to be stored in the first memory in association with the translated code block, and the processor reduces the threshold for the instruction corresponding to the saved identification information, over a given period of time after the part or all of the translated code block is removed.

7. A non-transitory computer readable recording medium having stored therein a program for causing a computer to execute a process comprising:

generating a translated code block for an instruction, included in a target program to be executed, for which the number of executions through sequential interpretation is greater than or equal to a threshold, and storing the generated translated code block in a first storage unit;

removing part or all of the translated code block from the first storage unit at an execution time;

determining an amount of time that has elapsed since the execution time and comparing the determined amount of time that has elapsed since the execution time with a predetermined amount of time;

when the amount of time that has elapsed since the execution time is less than the predetermined amount of time, reducing the threshold with respect to the number of executions over a given period of time after the part or all of the translated code is been removed, an amount of reduction of the threshold being larger as the amount of time that has elapsed since the execution time becomes shorter; and when the amount of time that has elapsed since the execution time is not less than the predetermined amount of time, maintaining the threshold.

8. The non-transitory computer readable recording medium according to claim 7, wherein the translated code block includes translated code blocks to be removed, the removing stores, in a second storage unit, information indicating a translated code block among the translated code blocks to be removed for which no instruction corresponding to the translated code block in the target program being executed is updated after the translated code block is generated, and the generating reduces the threshold for the translated code block indicated by the information stored in the second storage unit, over a given period of time after the part or all of the translated code block is removed.

9. The non-transitory computer readable recording medium according to claim 7, wherein the removing saves identification information identifying an instruction corresponding to the translated code block, the instruction being stored in the first storage unit in association with the translated code block, and the generating reduces the threshold for the instruction corresponding to the saved identification information, over a given period of time after the part or all of the translated code block is removed.

* * * * *